Patented Feb. 27, 1940

2,192,154

UNITED STATES PATENT OFFICE 2,192,154

METHOD OF EXTRACTING COPPER FROM ALKALINE SOLUTIONS

Max Otto Schuermann and Franz Gerstner, Dormagen, Germany, assignors to American Bemberg Corporation, New York, N. Y., a corporation of Delaware No Drawing. Application December 23, 1938, Serial No. 247,410. In Germany December 24, 1937

9 Claims. (Cl. 75—108)

This invention relates to a method of extracting copper from alkaline solutions.

It is an object of the invention to extract copper in a cheap and simple manner from alkaline solutions of low concentration which occur in large quantities, for instance, in the form of ammoniacal copper containing water, in the production of artificial fibres from cuprammonium cellulose solutions.

Another object of the invention is to carry out the copper extracting process by means of substances which are available as waste liquid in the same plants in which the said alkaline solutions occur.

It has been suggested that copper may be extracted from the said solutions by the addition of lime or trivalent iron salts. In this case, the copper is found in the form of copper hydroxide in the deposits. However, the yield thus obtained is not satisfactory, since a substantial part of the copper cannot be deposited in this manner, but remains in the waste in a colloidal or dissolved form.

We have now found that the copper can be extracted very efficiently from its alkaline solutions, even in cases where there is a very low copper content, by adding to the alkaline solution an iron salt and causing circulation of the copper containing iron slime which is being deposited. This slime was found to be able to precipitate the copper very efficiently from the solution, even when only a very low copper content exists, and to absorb more and more copper, whereby the final separation of the copper from the iron is greatly facilitated. In this slime copper and iron occur essentially in the form of hydroxides and/or basic salts, such as carbonates and sulphates. The composition of the slime varies of course in accordance with the composition of the alkaline solution of low copper concentration to be extracted.

The novel process will be better understood by reference to a practical process of extracting copper from the water occurring in the spinning operation in the cuprammonium silk process. In this case, the major portion of copper is at first extracted according to one of the well known methods, for example by the addition of lime or ferric salts to the water. It is thus possible to reduce the copper content of the water to about 20 grs./m.$^3$.

To the drawn-off water is then again added an iron salt and the iron slime deposits thereby formed are continuously drawn off and again added to the water. It is thus possible to reduce the copper content of the water to about 3 grs./m.$^3$ while the ratio of copper to iron in the slime can be increased, by repeated circulation of the slime, to about 1:2. The copper is in the form of the well known copper slime.

We prefer to use in our process at first a bivalent iron salt rather than a trivalent iron salt. More particularly, we may use the waste water obtained by the cementation of acid copper solutions. It is then possible, by aerating the deposited copper containing iron slime during the circulation, to oxidize the same gradually to trivalent iron hydroxide. The precipitating effect of the iron may be further augmented by the addition of small quantities of an oxidizing agent, as for example, chlorine. It will be understood that a great economical advantage is obtained by the use of the cementation waste water which otherwise would remain unused.

Example 1

50 parts by volume of a ferrous sulfate solution containing 6 grs. iron per liter are added to 1000 parts by volume of used precipitating water from the cuprammonium silk production containing 16 mgrs. of copper and 600 mgrs. of ammonia per liter. 13 mgrs. of copper are precipitated from the solution by the ferrous hydroxide which is being formed. After sedimentation the liquid above the deposits is drawn off and the deposit is used as a precipitant for the next precipitating operation. Generally, the ferrous hydroxide has been converted to ferric hydroxide after the fourth precipitation. After the deposit has been used 20 times, the ratio of copper to iron therein amounts to about 1:1.5, as compared to 1:23 after the first precipitation.

Instead of using ferrous sulfate it is also possible to add the corresponding quantity of ferric sulfate. In this case, there is no oxidizing of ferrous hydroxide to ferric hydroxide.

Example 2

100 parts by volume of a waste liquid occurring in the cementation of copper, having an iron content of 5.5 g. per liter, are added to 1000 parts by volume of used precipitating water containing 14 mgrs. copper and 600 mgrs. ammonia per liter. Moreover, 20 parts by volume of chlorine lye of 0.02% concentration, formed for example from chlorine water and sodium hydroxide, are added with each precipitation and for the rest, the process is carried out in the same manner as described under Example 1. There are precipitated 10 mgrs. of copper per liter with each precipitation. After the third precipitation the ferrous hydroxide has been converted almost completely to ferric hydroxide. After the deposit has been used eight times, the ratio of copper to iron is 1:5. The copper is then separated from the iron slime by any suitable chemical or metallurgical method.

Generally, fresh waste water will be exposed to the precipitating action of the iron slime of increasing copper content in each precipitating operation, but it is also contemplated to subject the same water repeatedly to the precipitating action of the iron slime which, due to its increasing copper content, shows an increased precipitating effect with each phase of the process and, therefore, is capable of precipitating copper from solutions of less and less copper content.

It will be clear that where the term "water" is used in this specification it is understood to comprise liquids of any kind containing a substantial amount of water or the like.

Apparatus and practical methods for carrying out chemical processes of the kind referred to are known in the art so that it will not be necessary to describe such apparatus and methods in detail here.

We claim:

1. In a process for extracting copper from alkaline solutions of low concentration, the steps which comprise adding an iron salt to the solutions, drawing off the copper containing iron slime deposit, adding said slime once more to said solutions and repeating said steps until said iron slime contains a substantial amount of copper.

2. In a process for extracting copper from alkaline solutions of low concentration, the steps which comprise adding an iron salt to the solutions, drawing off the copper containing iron slime deposit, adding said slime once more to fresh solutions of the kind referred to and repeating said steps until said iron slime contains a substantial amount of copper.

3. In a process for extracting copper from alkaline solutions of low concentration, the steps which comprise adding a bivalent iron salt to the solutions, drawing off the copper containing iron slime deposit, aerating said deposit, adding said slime once more to solutions of the kind referred to and repeating said steps until said iron slime contains a substantial amount of copper.

4. In a process for extracting copper from alkaline solutions of low concentration, the steps which comprise adding an iron salt to the solutions in the form of the waste water occurring at the cementation of acid copper solutions, drawing off the copper containing iron slime deposit, aerating said deposit, adding said slime once more to solutions of the kind referred to and repeating said steps until said iron slime contains a substantial amount of copper.

5. In a process for extracting copper from alkaline solutions of low concentration, the steps which comprise adding an iron salt to the solutions in the form of the waste water occurring at the cementation of acid copper solutions, drawing off the copper containing iron slime deposit, aerating said deposit, adding said slime once more to solutions of the kind referred to, together with small quantities of an oxidizing agent, and repeating said steps until said iron slime contains a substantial amount of copper.

6. In a process for extracting copper from alkaline solutions of low concentration, the steps which comprise adding an iron salt to a waste precipitating water obtained in the manufacture of cuprammonium silk, drawing off the copper containing iron slime deposit, adding said slime deposit once more to said water and repeating said steps until said iron slime contains a substantial amount of copper.

7. In a process for extracting copper from alkaline solutions of low concentration, the steps which comprise adding an iron salt to a waste precipitating water obtained in the manufacture of cuprammonium silk, drawing off the copper containing iron slime deposit, adding said slime deposit once more to fresh water of the kind referred to and repeating said steps until said iron slime contains a substantial amount of copper.

8. In a process for extracting copper from alkaline solutions of low concentration, the steps which comprise adding a bivalent iron salt to a waste precipitating water obtained in the manufacture of cuprammonium silk, drawing off the copper containing iron slime deposit, aerating said deposit, adding said slime once more to a water of the kind referred to and repeating said steps until said iron slime contains a substantial amount of copper.

9. In a process for extracting copper from alkaline solutions of low concentration, the steps which comprise adding an iron salt to a waste precipitating water obtained in the manufacture of cuprammonium silk, drawing off the copper containing iron slime deposit, aerating said deposit, adding said slime once more to a water of the kind referred to, together with small quantities of an oxidizing agent, and repeating said steps until said iron slime contains a substantial amount of copper.

MAX OTTO SCHUERMANN.
FRANZ GERSTNER.